(12) United States Patent
Granz

(10) Patent No.: US 9,830,940 B1
(45) Date of Patent: Nov. 28, 2017

(54) HEAT-ASSISTED SHINGLED MAGNETIC RECORDING WITH VARIABLE TRACK WIDTHS

(71) Applicant: Seagate Technology LLC, Cupertino, CA (US)

(72) Inventor: Steven Granz, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/154,010

(22) Filed: May 13, 2016

(51) Int. Cl.
| | | |
|---|---|---|
| G11B 11/00 | (2006.01) | |
| G11B 7/1263 | (2012.01) | |
| G11B 20/12 | (2006.01) | |
| G11B 7/126 | (2012.01) | |
| G11B 5/00 | (2006.01) | |
| G11B 7/1267 | (2012.01) | |
| G11B 5/60 | (2006.01) | |

(52) U.S. Cl.
CPC ............ *G11B 7/1263* (2013.01); *G11B 7/126* (2013.01); *G11B 20/1217* (2013.01); *G11B 5/6088* (2013.01); *G11B 7/1267* (2013.01); *G11B 2005/0021* (2013.01); *G11B 2020/1238* (2013.01)

(58) Field of Classification Search
None
See application file for complete search history.

(56) References Cited

U.S. PATENT DOCUMENTS

| | | | | |
|---|---|---|---|---|
| 4,646,168 | A * | 2/1987 | Sonobe | G11B 5/00 360/18 |
| 8,867,161 | B2 | 10/2014 | Emo et al. | |
| 9,099,103 | B1 * | 8/2015 | Krichevsky | G11B 11/10595 369/13.26 |
| 9,117,479 | B1 * | 8/2015 | Madison | G11B 5/455 369/13.33 |
| 9,472,212 | B2 * | 10/2016 | Ma | G11B 7/1263 369/13.33 |
| 9,472,223 | B1 * | 10/2016 | Mendonsa | G11B 5/59638 369/13.33 |
| 2006/0117333 | A1 * | 6/2006 | Taguchi | G11B 5/02 369/13.33 |
| 2013/0028061 | A1 * | 1/2013 | Rosen | G11B 5/02 369/13.32 |
| 2016/0055881 | A1 * | 2/2016 | Cordle | G11B 20/10388 369/13.26 |
| 2016/0147650 | A1 * | 5/2016 | Gao | G06F 12/0238 369/13.33 |
| 2016/0148635 | A1 * | 5/2016 | Zhu | G11B 7/1263 369/13.26 |
| 2016/0148641 | A1 * | 5/2016 | Gao | G11B 5/09 369/13.26 |

(Continued)

OTHER PUBLICATIONS

U.S. Appl. No. 14/686,561, filed Apr. 14, 2015.
U.S. Appl. No. 14/938,298, filed Nov. 11, 2015.
U.S. Appl. No. 14/686,456, filed Apr. 14, 2015.

*Primary Examiner* — Tan X Dinh
(74) *Attorney, Agent, or Firm* — Holzer Patel Drennan

(57) ABSTRACT

A storage device includes a storage controller configured to operate a heat-assisted magnetic recording head to write data to a band of consecutive data tracks in a consecutive track order while selectively alternating a power level of the heat source when writing to some data tracks of the band.

12 Claims, 6 Drawing Sheets

(56) References Cited

U.S. PATENT DOCUMENTS

| | | | | |
|---|---|---|---|---|
| 2016/0148642 A1* | 5/2016 | Gao | ............... | G11B 5/09 360/48 |
| 2016/0148643 A1* | 5/2016 | Gao | ............... | G11B 20/1217 369/13.35 |
| 2016/0148644 A1* | 5/2016 | Zhu | ............... | G11B 20/1217 360/48 |
| 2017/0186455 A1* | 6/2017 | Hara | ............... | G11B 5/59627 369/13.26 |

* cited by examiner

HEAT-ASSISTED SHINGLED MAGNETIC RECORDING WITH VARIABLE TRACK WIDTHS

BACKGROUND

Consumer demand drives continuing innovation of storage devices of decreasing size and increased storage capacity. In the case of disc-based storage mediums, the term areal density capability (ADC) may refer to a product of a number of data tracks on a disk (e.g., tracks per inch (TPI)) and a number of data bits along each data track (e.g., bits per inch (BPI)). The tracks per inch value is sometimes referred to as "radial density," while the bits per inch value may be referred to as the "recording density," "bit density," or "linear density." As TPI and BPI values increase, read heads have greater difficulty accurately reading data from the data tracks, resulting in a higher bit error rate (BER). If the BER becomes too high, storage device performance may suffer as error correction and read retry operations are performed. Therefore, some data storage devices are configured with preset TPI and BPI values selected to achieve a high ADC while maintaining an acceptable BER. A number of challenges are associated with increasing drive TPI and BPI beyond current limits.

BRIEF DESCRIPTIONS OF THE DRAWINGS

SUMMARY

One implementation of the disclosed technology provides a storage controller that operates a heat-assisted magnetic recording (HAMR) head to write data to a band of consecutive data tracks in a consecutive track order while dynamically altering a heat source power level of the HAMR head when writing to some data tracks in the band. According to one implementation, the storage device controller is configured to alternate a power level of the heat source for data writes to each alternating data track in the band. According to another implementation, the storage device controller reduces the heat source power level when writing to a last data track in the band as compared to the heat source power level used for writing data to other data tracks in the band.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
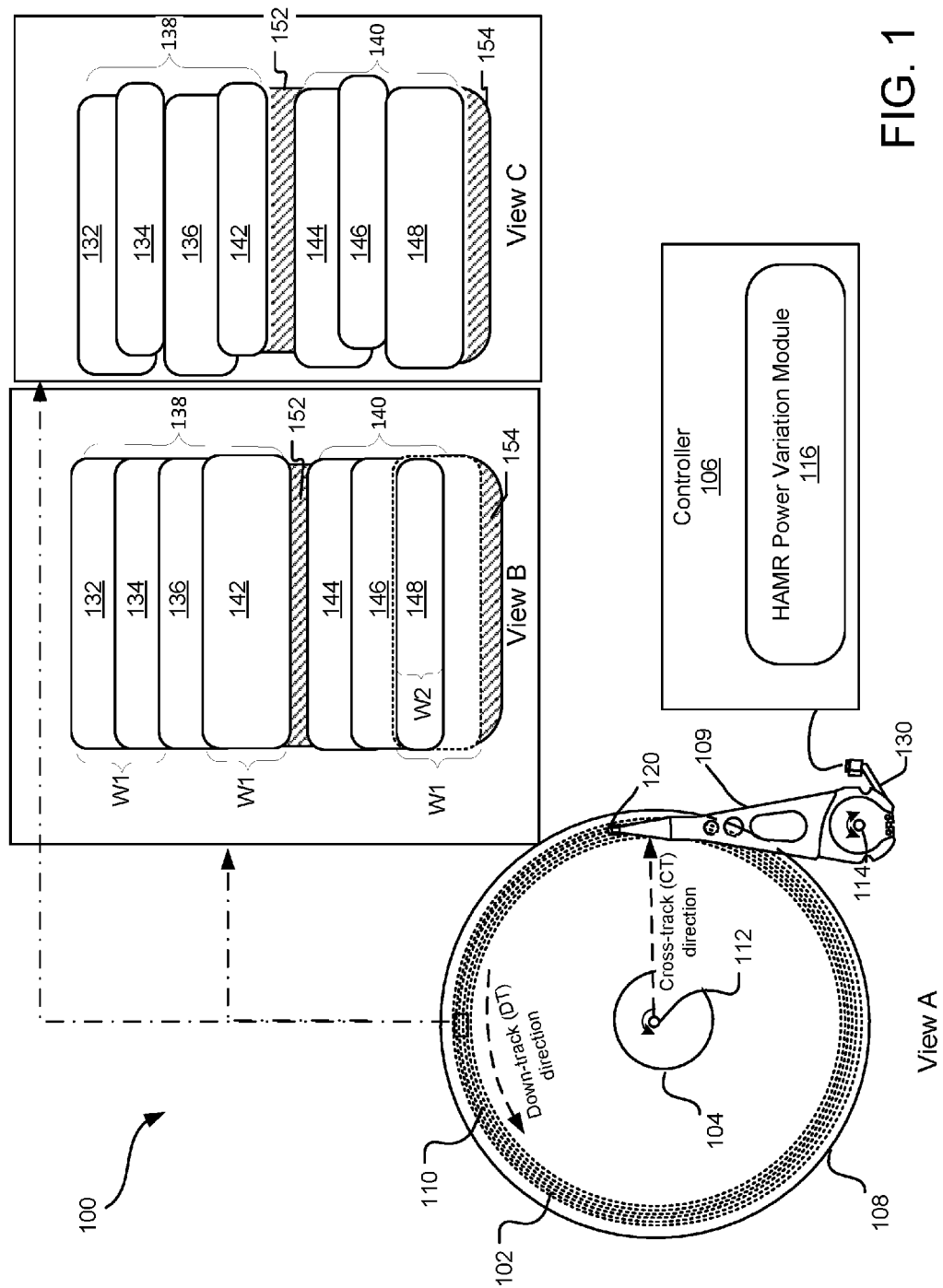
FIG. 1 illustrates an example data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disk on which data bits can be recorded using a magnetic write element (not shown) and from which data bits can be read using a magnetoresistive element (not shown). As illustrated in View A, the magnetic storage medium 108 rotates about a spindle center or a disk axis of rotation 112 during rotation, and includes an inner diameter 104 and an outer diameter 102 between which are a number of concentric data tracks 110. Information may be written to and read from data bit locations in the data tracks on the magnetic storage medium 108.

The transducer head assembly 120 is mounted on an actuator assembly 109 at an end distal to an actuator axis of rotation 114. The transducer head assembly 120 flies in close proximity above the surface of the magnetic storage medium 108 during disk rotation. The actuator assembly 109 rotates during a seek operation about the disk axis of rotation 112. The seek operation positions the transducer head assembly 120 over a target data track for read and write operations. During a write operation, a write element (not shown) of the transducer head assembly 120 converts a series of electrical pulses sent from a controller 106 into a series of magnetic pulses of commensurate magnitude and length, and the magnetic pulses selectively magnetize magnetic grains of the magnetic storage medium 108 as they pass below the transducer head assembly 120.

In one implementation, the write element is a heat-assisted magnetic recording (HAMR) head including a write pole, a heat source (e.g., a laser), a waveguide, and a near-field transducer (NFT). Heat (e.g., light) from the laser is directed through the waveguide and focused onto the storage medium 108 by the NFT at a location concurrently subjected to a magnetic pulse generated by the write element. This process allows for a selective lowering of the magnetic coercivity of the grains of the storage medium 108 in a tightly focused area of the storage medium 108 that substantially corresponds to an individual data bit. The heated region is encoded with the recorded data bit based on the polarity of the applied magnetic write field. After cooling, the magnetic coercivity substantially returns to its pre-heating level, thereby stabilizing the magnetization for that data bit. This write process is repeated for multiple data bits on the storage medium, and such data bits can be read using a magneto-resistive read head.

In FIG. 1, the controller 106 includes (or is communicatively coupled to) a heat source power variation module 116. The heat source power variation module 116 controls settings of HAMR head heat source on the transducer head assembly 120 to selectively increase or decrease a power of the HAMR heat source based on a location of a data track receiving data of a write operation.

Increasing power of a heat source widens an area on the storage medium 108 passing below the HAMR head heat source and write element that may be magnetically polarized (e.g., flipped) by magnetic pulses emitted by the HAMR head. This area is also referred to herein as the "magnetic footprint" of the write element. Stated differently, increasing heat source power while operating the writer to write data has the effect of widening a target data track in a cross track (CT) direction while decreasing the heat source power during a write operation to a target data track has the effect of narrowing a target data track in the cross-track (CT) direction.

When data tracks are made wider by increasing the heat source power, a maximum linear density, or the density of data bits arranged in the down-track (DT) direction, can be increased as compared to a maximum linear density of narrow data tracks while maintaining an acceptable bit error rate. However, this linear density is, in general, increased at the expense of track density. That is, data tracks can be made wider in the cross-track direction to accommodate more bits in the down-track direction but widening the data tracks, in turn, decreases a total number of data tracks that can fit on the storage medium 108.

Another competing concern that imposes limits on attainable areal density capacity is adjacent track interference (ATI). ATI refers to degradation of stored data that may occur on one data track over time due to repeated writes to an adjacent data track. In general, as track density increases, ATI worsens. The herein disclosed data write and management techniques alleviate some limitations of ATI and boost attainable areal density capacity of the storage medium 108 by intelligently manipulating track pitch, track overlap, and track size via selective alteration of HAMR head laser power in a shingled magnetic recording (SMR) system.

The following discussion details two example SMR data management schemes employing the HAMR power variation module 116 to improve recording capacity in a HAMR. It should be understood that the example functions served by the HAMR power variation module 116 may also be useful in implementing a variety of other data management schemes not discussed herein, including those with applications in systems that do not utilize SMR.

As background, SMR is one way to decrease the size of data cells on the magnetic storage medium 108 without a corresponding decrease in the size of a writer on the transducer head assembly 120. In SMR systems, a magnetic field produced by the writer is strong enough to affect two adjacent data tracks on the magnetic storage medium 108 on a single pass of the writer. In other words, a magnetic footprint (e.g., an area of the storage medium magnetically polarized by the writer on a single pass) may be defined to correspond to two different data tracks on the magnetic storage medium 108.

For example, View B illustrates a data write by a HAMR head having a magnetic footprint W1 that is defined to be equal in width to a width of two data tracks combined (e.g., 132 and 134). An initial write to the data track 132 incidentally magnetizes (e.g., corrupts) data on the adjacent data track 134. The corrupted data in the data track 134 can be corrected on a subsequent pass of the writer over the data track 134, but this data write to the data track 134 in turn corrupts data on data track 136, and so on.

To manage data in this SMR system despite the above-described overlap, data tracks on the data storage device 100 may be grouped into data bands (e.g., data bands 138, 140), where each data band is separated from other adjacent data bands by one or more guard tracks (e.g., guard tracks 152 and 154) where no data is stored. In an example write operation of the data track 132, the storage device 100 reads all data tracks in the associated data band 138 (e.g., including data tracks 132, 134, 136, and 142) into a memory location in a consecutive order. In memory, the data storage device 100 updates the one or more data cells to be changed by the write operation and then re-writes, in a consecutive track order, the data tracks 132, 134, 136, and 142 including the one or more updated cells.

Notably, the last data track in each of the data bands 138, 140 (e.g., the data track 142 in band 138 and data track 148 in band 140) is adjacent to a guard track 152 or 154 and is not overlapped by any other data track. Therefore, the last track of each SMR data band is also referred to herein as the "non-overlapped track." In some implementations, the HAMR power variation module 116 selectively reduces HAMR heat source power when writing to the non-overlapped track band in some or all data bands, such as when writing to the non-overlapped the data track 148 in the data band 140). Such a reduction in HAMR heat source power has the effect of reducing the written track width of the non-overlapped track 148 from an amount W1 to an amount W2, as further shown in View B. In addition, a center of the non-overlapped data track 148 may be shifted toward the immediately adjacent data track 146 such that an effective track width of the data track 146 is equal or approximately equal to an effective track width of the data track 148. As used herein, the term "effective track width" refers to a width of a written data track that is not overlapped by any other data track. Selectively decreasing HAMR heat source power when writing to the non-overlapped data track in some or all data bands, as described above, makes more efficient use of space on the storage medium 108, which in turn allows for an increase in a track density (e.g., the total number of tracks per inch (TPI)).

In some implementations, the HAMR power variation module 116 does not selectively reduce HAMR heat source power when writing to the non-overlapping data of a data band, as shown by the size of the magnetic footprint W1 used to write all data tracks in the data band 138. In this case, linear density (BPI) of the non-overlapping data track may be increased as compared to a linear density of other data tracks in a same data band.

View C illustrates data tracks of the magnetic storage medium 108 storing data according to another SMR technique that makes use of varied heat source power of the HAMR head. Like the SMR technique of View B, data is written to the shingled bands 138, 140 according to a consecutive track order. For example, a write to the band 138 entails a write to track 132, followed by a write to track 134, followed by a write to track 136, and thereafter a write to track 142. However, the controller 106 defines the center of each track in a non-conventional manner such that there exists a variable degree of overlap between different pairs of adjacent tracks. For example, there is a substantially large overlap between the regions magnetized in consecutive data writes to the data tracks 132 and 134. In contrast, there is little or no overlap between the regions magnetized in consecutive data writes to the data tracks 134 and 136.

Benefits of this staggered overlap scheme are observed when the HAMR power variation module 116 also varies a HAMR heat source power when writing to alternating tracks in each of the data bands (e.g., 138, 140). For example, a first higher HAMR heat source power is used to write data to the tracks 132, 136, 144, and 148 and a second lower heat source power is used when writing data to the tracks 134, 142, 146, etc. Linear density is selectively increased when writing to some data tracks, such as those written with the higher HAMR heat source power.

One benefit of this alternating wide/narrow written data track scheme is that linear density can be increased on the wider data tracks as compared to the narrow data tracks while still maintaining an acceptable bit error rate. Thus, half of data tracks on the storage medium 108 may be written at a higher linear density than a linear density typical of a conventional SMR scheme. Another benefit of this technique is attributable to the use of the staggered (e.g., mismatched) track overlaps in conjunction with the alternating wide/low written data track widths. Specifically, this scheme facilitates a uniform increase in track pitch (e.g., center-to-center adjacent track spacing) as compared to conventional SMR systems, without decreasing a total number of tracks on the storage medium. This increase in the track pitch further translates to a similar observable ATI as in conventional SMR systems without a significant loss of track density or linear density for data tracks written at an increased HAMR heat source power. By combining this variable HAMR power scheme with the illustrated SMR varied-track-overlap scheme, ADC can be significantly improved as compared to other HAMR SMR systems that use a constant HAMR power and track overlap.

The controller 106 includes software and/or hardware, and may be implemented in any tangible computer-readable storage media within or communicatively coupled to the data storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
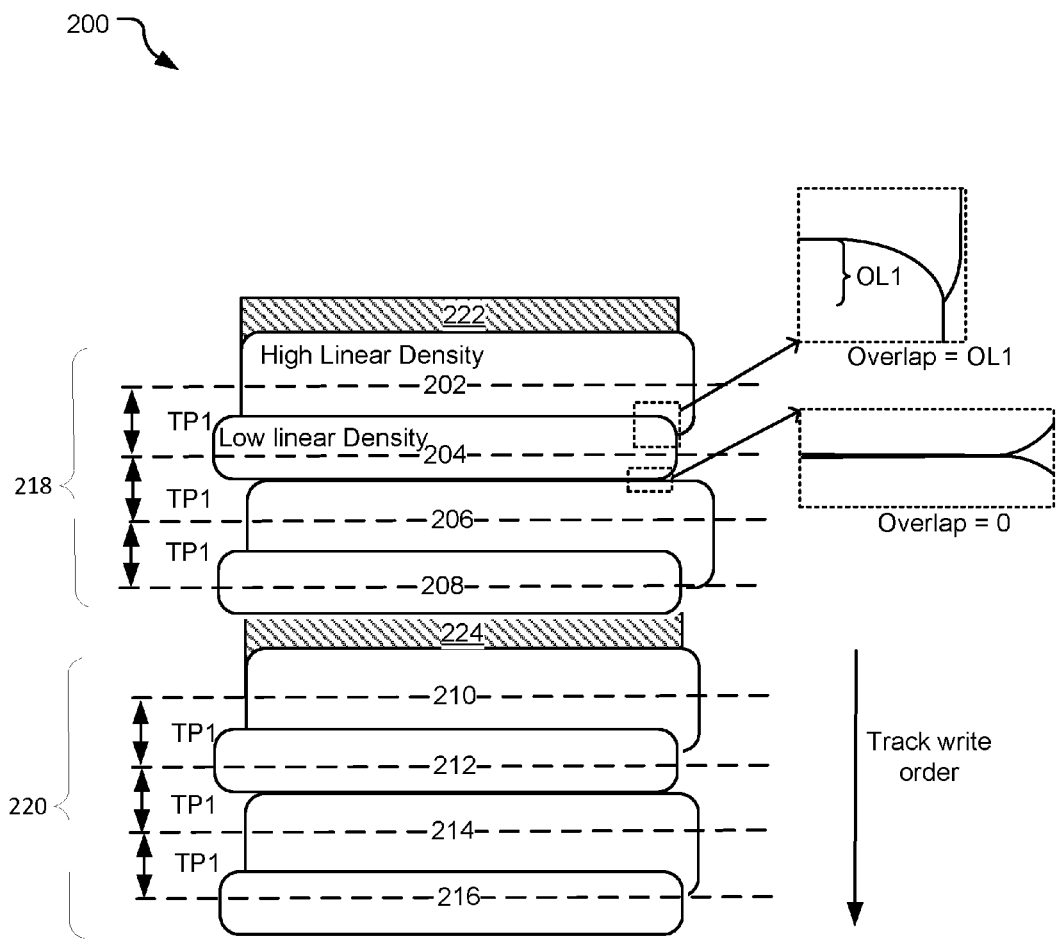
FIG. 2 illustrates example techniques for selectively altering heat source power of a heat-assisted magnetic recording (HAMR) head to increase areal density capacity (ADC) in a shingled magnetic recording system.

FIG. 2 illustrates example techniques for selectively altering power of a HAMR heat source to increase ADC on a magnetic storage medium 200 in a shingled magnetic storage system. The magnetic storage medium 200 includes a number of data tracks organized into data bands (e.g., data bands 218 and 220) such that each data band is separated from the immediately adjacent data band by a guard track (e.g., guard tracks 222, 224) where no data is stored.

Each of the data bands 218 and 220 includes a number of data tracks (e.g., data tracks 202, 204, 206, 208, 210, 212, 214, and 216) written according to a consecutive track order. For example, an update to data track 206 of the data band 218 may, in one implementation, entail (1) reading data tracks 202, 204, 206 and 208 into memory; (2); within the memory, merging the new data of track 206 in place of old data; and (3) re-writing the data tracks 202, 204, 206, and 208 from the memory.

Each of the data bands 218, 220 further includes data tracks of two different alternating track widths. For example, a first series of alternating data tracks 202 and 206 within the data band 218 have a first written track width that is wider than a second written track width of interlaced data tracks 204 and 208 of the data band 218. To achieve this variance in written track width, the wider data tracks (e.g., 202, 206, 210, and 214) are written with a HAMR heat source power set to a first power level while the narrower data tracks (e.g., 204, 208, 212, and 216) are written with the HAMR heat source power set to a second power level lower than the first power level.

In addition, consecutive data tracks in FIG. 2 are unevenly offset from one another such that there exist differing degrees of overlap between consecutive data tracks. For example, each of the narrower data tracks (e.g., the data tracks 204, 208, 212 and 216) overlaps the immediately adjacent, previously-written data track by the same amount, OL1, but each of the wider data tracks (e.g., the data tracks 202, 206, 210, and 214) do not overlap the immediately adjacent, previously-written data track at all. As a result of this uneven track overlap scheme and the alternating wide/narrow written track widths, track pitch (TP1) is uniform across the area shown on the magnetic storage medium 208. For example, a center-to-center distance TP1 is identical between each pair of adjacent data tracks. In some implementations, the track pitch TP1 is uniform across the entire surface of the storage medium 200; in other implementations the track pitch TP1 is uniform within each of a number of defined radial zones on the storage medium 200. Notably, this uniform track pitch may be slightly larger than a track pitch in an otherwise identical SMR system (e.g., same storage medium, same TPI) where the data tracks in each data band are of identical written width and placed according to a uniform overlap scheme. This larger track pitch translates to a similar observable ATI as compared to such a conventional SMR system without a loss in linear density or track density.

In one implementation, the tracks 202 and 206 store data bits of a higher linear density than the interlaced tracks 204 and 208. For example, a first heat source power may be optimized for writing to the wider data tracks (e.g. 202, 206, 210, 214) at a first linear density while a second heat source power may be optimized for writing data to the narrower data tracks (e.g., 204, 208, 212, and 216) at a second linear density lower than the first linear density. This dual linear density scheme for alternating tracks provides for a total ADC that is higher than conventional SMR systems employing uniform linear densities within each data band.

Figure 3:
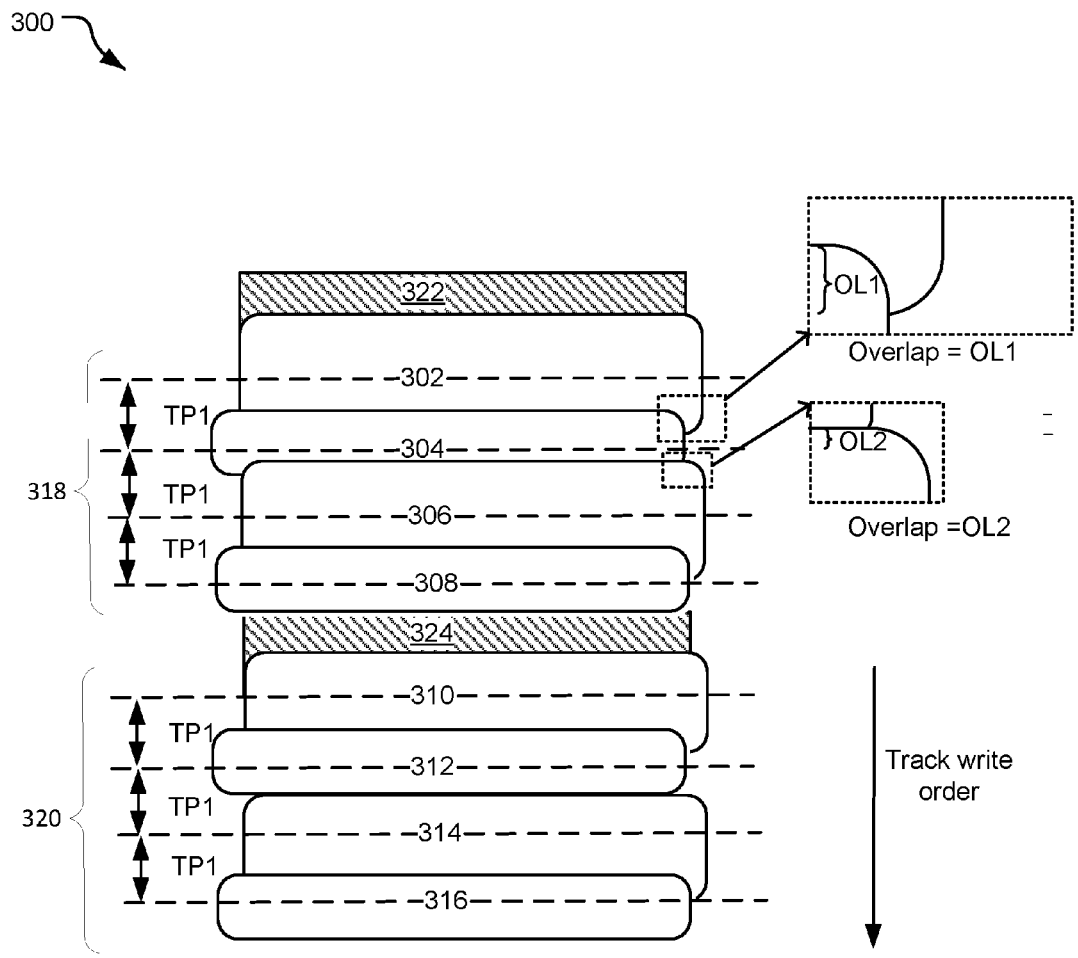
FIG. 3 illustrates further example techniques for selectively altering heat source power of a HAMR head to increase ADC in a shingled magnetic storage system.

FIG. 3 illustrates further example techniques for selectively altering power of a HAMR heat source to increase ADC on a magnetic storage medium 300 in a shingled magnetic storage system. The magnetic storage medium 300 includes a number of data tracks organized into data bands (e.g., data bands 318 and 320) such that each data band is separated from the immediately adjacent data band by a guard track (e.g., guard tracks 322, 324) where no data is stored.

Each of the data bands 318 and 320 includes a number of data tracks (e.g., data tracks 302, 304, 306, 308, 310, 312, 314, and 316) written according to a consecutive track order (e.g., as indicated by the arrow labeled "Track write order" in FIG. 3).

In addition, each of the data bands 318, 320 includes data tracks of altering track widths. For example, alternating data tracks 302 and 306 have a first written track width that is wider than a second written track width of interlaced data tracks 304 and 308. To achieve this variance in written track width, the wider data tracks (e.g., 302, 306, 310, and 314) are written with a HAMR heat source power set to a first power level while the narrower data tracks (e.g., 304, 308, 312, and 316) are written with the HAMR heat source power set to a second power level lower than the first power level.

The placement of consecutive data tracks in FIG. 3 is staggered so that there exist differing degrees of overlap between each data track and the immediately adjacent previously-written track. For example, the data track 304 overlaps the data track 302 by a first overlap amount (OL1), while the data track 306 overlaps the data track 304 by a second overlap amount (OL2). In one implementation, the first overlap amount OL1 is larger than the second overlap amount OL2. As a result of this uneven track overlap scheme including tracks of variable (e.g., wide v. narrow) written widths, track pitch (TP1) is uniform across the area shown on the magnetic storage medium 300. In some implementations, the track pitch TP1 is uniform across the entire surface of the storage medium 300; in other implementations the track pitch TP1 is uniform within each of a number of defined radial zones on the storage medium 300.

In one implementation, the wider written tracks (e.g., 302, 406, 310, and 312) store data bits of a higher linear density than the narrow written tracks (e.g., 304, 308, 312, and 316). For example, linear density may be optimized separately for the wider data tracks (e.g. 302, 306, 310, 314) and the narrow data tracks (e.g., 304, 308, 312, and 316) such that the wider data tracks are written at a first, higher HAMR laser power and higher linear density while the narrow data tracks are written at a second, lower HAMR laser power and lower linear density. This dual linear density scheme for alternating tracks provides for a total ADC that is higher than conventional SMR systems employing uniform linear densities within each data band.

Figure 4:
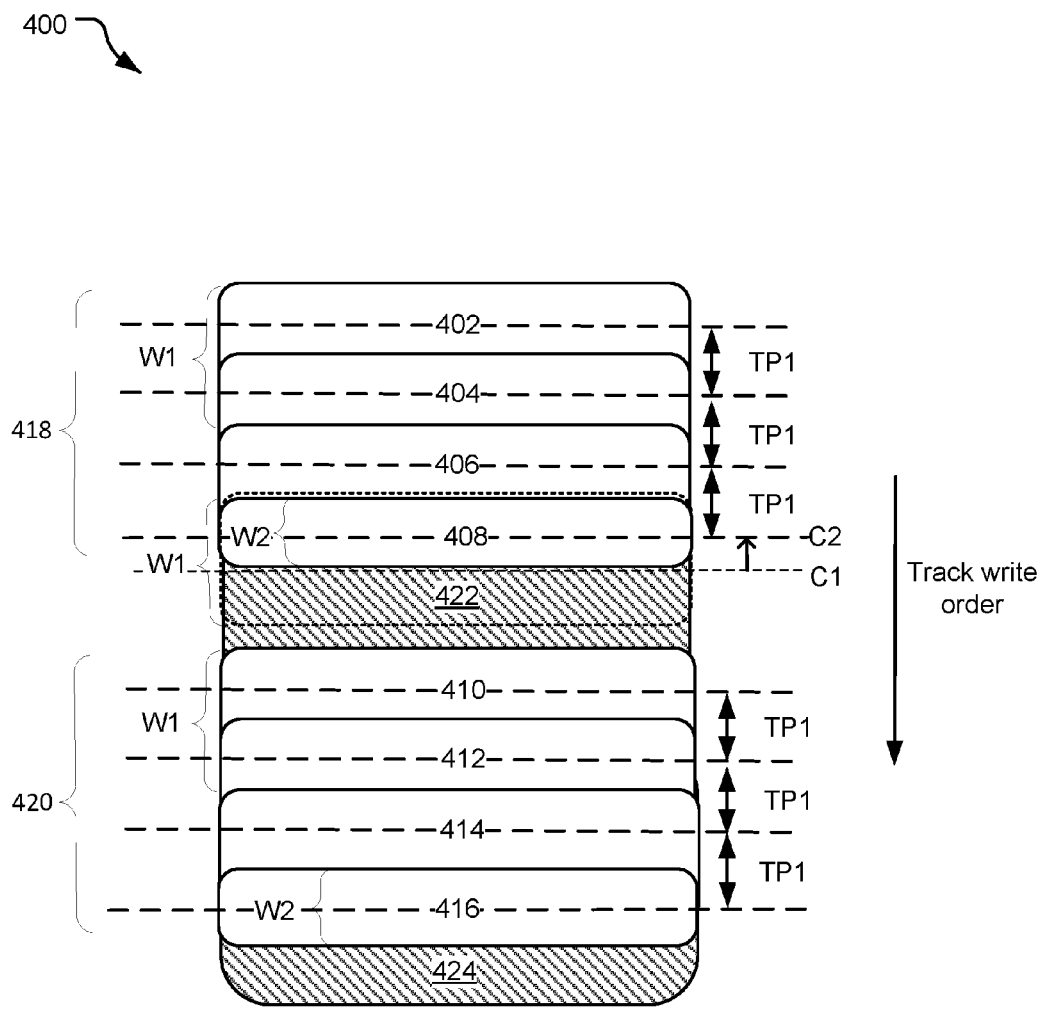
FIG. 4 illustrates still further example techniques for selectively altering power of a heat source power to increase ADC in a shingled magnetic storage system.

FIG. 4 illustrates still further example techniques for selectively altering power of a HAMR heat source to increase ADC on a magnetic storage medium 400 in a shingled magnetic storage system. The magnetic storage medium 400 includes a number of data tracks organized into data bands (e.g., data bands 418 and 420) such that each data band is separated from the immediately adjacent data band by a guard track (e.g., guard tracks 422, 424) where no data is stored. In operation, data tracks within each of the data bands 418 and 420 are written according to a consecutive write order, indicated by an arrow "Track write order" in FIG. 4.

In FIG. 4, a last data track in each of the data bands 418 and 420 has an effective track width approximately equal to an effective track width of other data tracks in a same data band 418 or 420. In one implementation, this effect is generated by a controller of the shingled magnetic storage system that selectively decreases a HAMR heat source power when writing data to last data track of each data band (e.g., data tracks 408 and 416). For example, the shingled data tracks 402 and 404 are written while the HAMR heat source power is set to allow the writer to generate a magnetic footprint W1, while each of the non-overlapped data tracks 408 and 416 are written while the HAMR heat source power is set to a lower power that allows the writer to generate a smaller magnetic footprint W2.

In the illustrated implementation, a center of the last data track in each data band 418 and 420 is shifted toward an adjacent track in the same data band. For example, a data write to the last data track 408 entails a reduction in the size of the magnetic footprint of the writer from W2 to W1 and a shift in the center of the data track 408 from a position C1 to C2 maintain a uniform or substantially uniform center-to-center spacing between all adjacent pairs of data tracks in the data bands 418 or 420, as shown by track pitch indicator "TP1".

In other implementations, a track pitch may be inconsistent within a data band. For example, a first data track and/or last data track in a data band may be positioned to deliberately have a different track pitch than other data tracks in the data band, as disclosed in U.S. Pat. No. 8,867,161, which is hereby incorporated by reference for all that it discloses or teaches.

Decreasing the HAMR heat source power to resize the last data track in each data band, as shown, saves space on the magnetic storage medium 400, allowing for the data bands to be placed closer together. This results in a net increase in total TPI of the magnetic storage medium 400.

To permit this decrease in effective track width of the last data track of each shingled band, the controller may—in some implementations—decrease the linear density (BPI) when writing to the last data tracks 408 and 416 of the data bands 418 and 420, respectively. In other cases, the last data tracks 408 and 416 store data of BPI equal to the BPI of data stored on other data tracks of the corresponding data bans 418 or 420.

Figure 5:
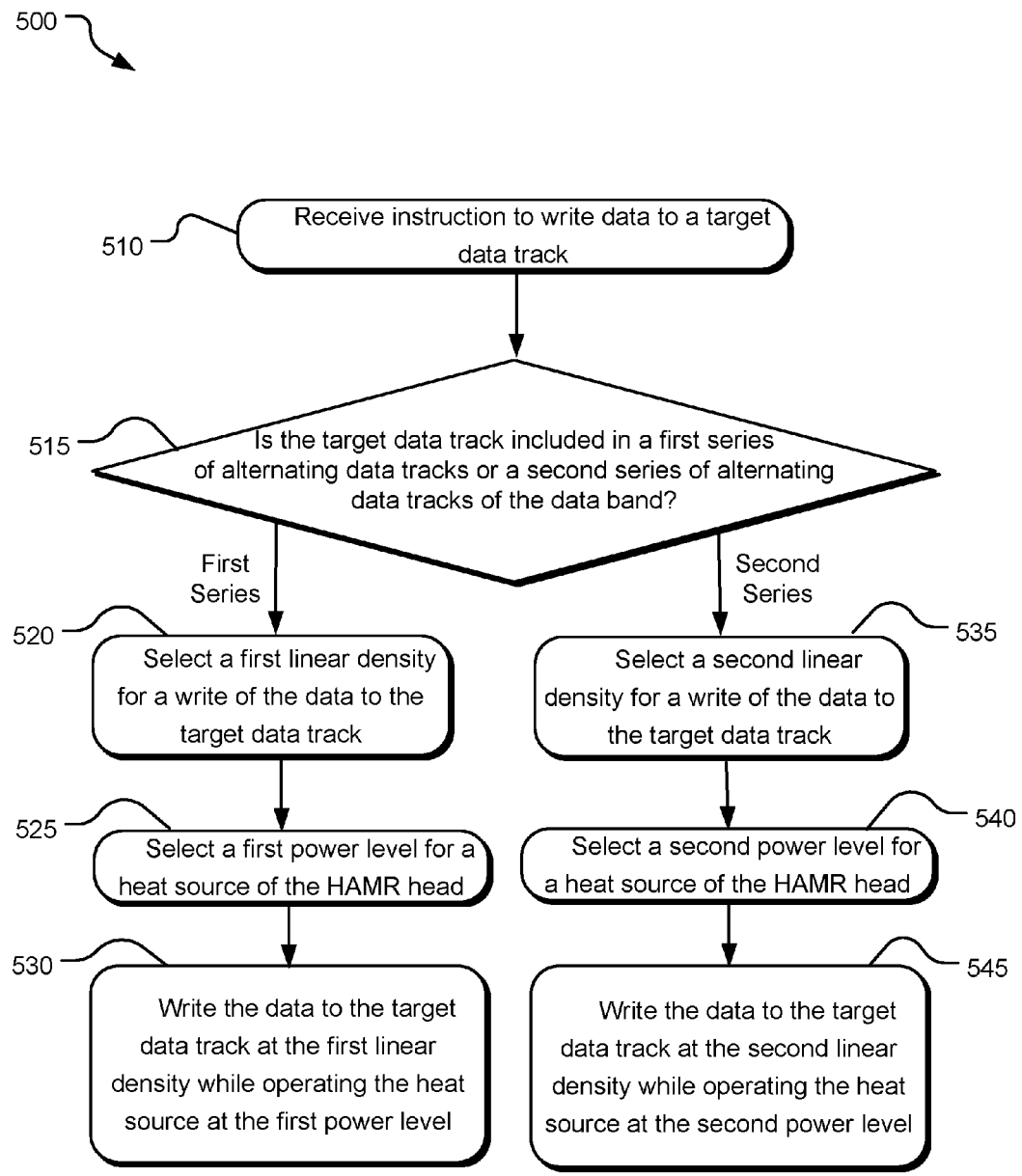
FIG. 5 illustrates example operations for selectively altering power of a HAMR head heat source to increase ADC on a magnetic storage medium in a shingled magnetic storage system.

FIG. 5 illustrates example operations 500 for selectively altering power of a HAMR heat source to increase ADC on a magnetic storage medium in a shingled magnetic storage system. A receiving operation 510 receives an instruction to write data to a target data track in a shingled data band of and SMR system. A determination operation 515 determines whether the target data track is included within a first series of alternating data tracks or a second series of alternating data tracks of the data band. In one implementation, the first series of alternating data tracks includes every other data track in the band (e.g., odd numbered tracks) and the second series of alternating data tracks includes the data tracks interlaced with the first series of alternating data tracks (e.g., the even-numbered tracks).

If the determination operation 515 determines that the target data track is included in the first series of alternating data tracks, operations 520-530 are performed. A selection operation 520 selects a first linear density for writing the data to the target data track, and another selection operation 525 selects a first power level for operating a heat source of the HAMR head (e.g., a laser) during a write to the target data track. Subsequently, a write operation 530 writes the data to the target data track at the first linear density while operating the heat source at the first power level.

If, on the other hand, the determination operation 515 determines that the target data track is included in the second series of alternating data tracks, operations 535-545 are performed. A selection operation 535 selects a second linear density for writing the data to the target data track, and another selection operation 540 selects a second power level for operating the heat source of the HAMR head during a write to the target data track. Subsequently, a write operation 545 writes the data to the target data track at the second linear density while operating the heat source at the second power level. In one implementation, the second linear density is higher than the first linear density and the second power level is higher than the first power level.

In some implementations of the disclosed technology, a track pitch is defined to be uniform for all data tracks in the data band. Due to differing write track widths (e.g., on account of the first and second laser powers), some data tracks in a data band may overlap a directly adjacent, previously written data track by a different degree than other data tracks. A few examples of this staggered overlap concept are shown and described in greater detail above with respect to FIGS. 2 and 3.

Figure 6:
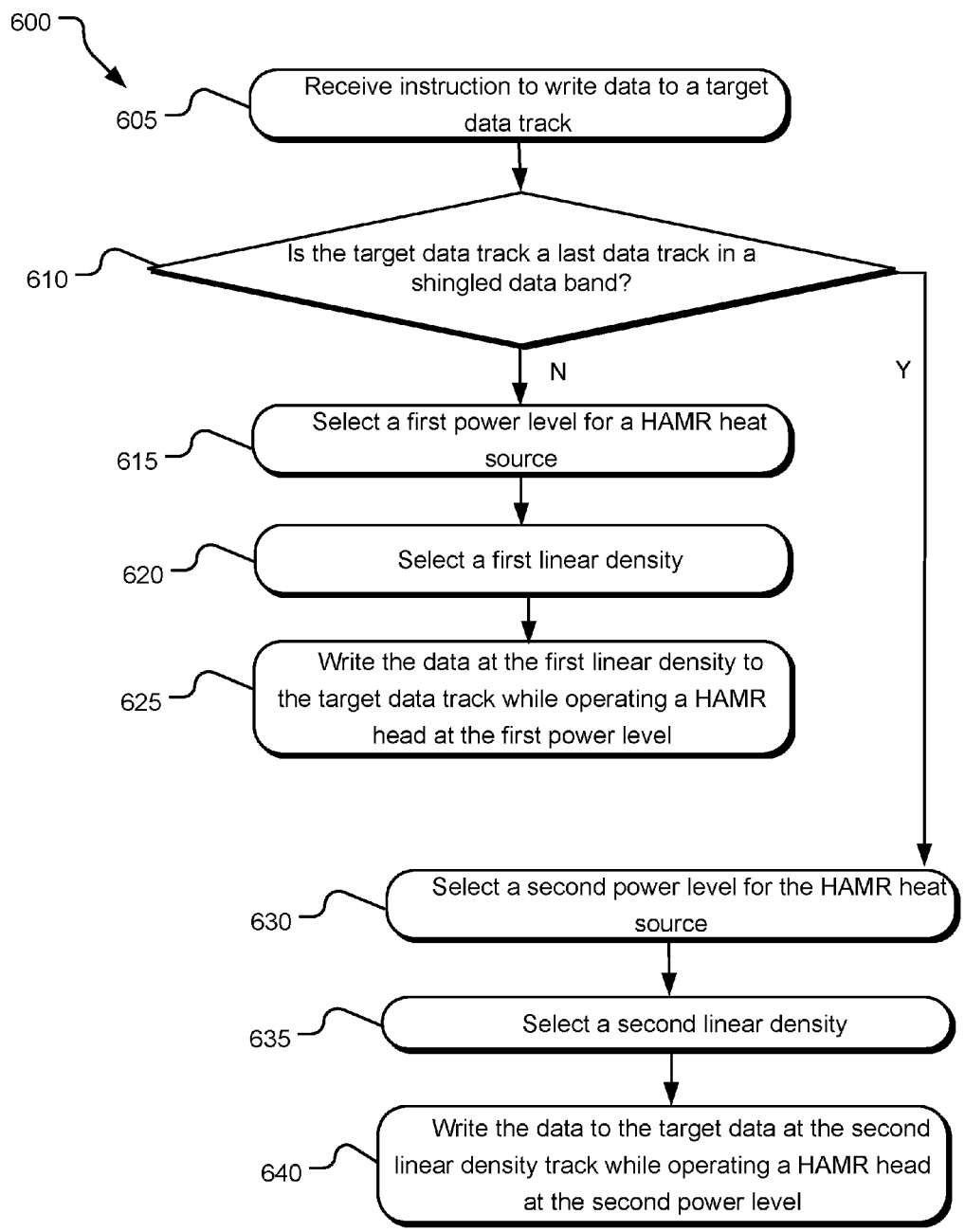
FIG. 6 illustrates example operations for selectively altering power of a HAMR head heat source when writing to a last data track of a shingled data band on a storage medium.

FIG. 6 illustrates example operations 600 for selectively altering power of a HAMR heat source when writing data to a last data track of a shingled data band on a storage medium. A receiving instruction 605 receives an instruction to write data to a target data track. A determination operation 610 determines if the target data track is a last data track (e.g., a non-overlapping track) in a shingled data band of an SMR system. The determination operation 610 may be performed, for example, by accessing a table stored in firmware of the storage device and identifying a write current parameter or a clearance parameter associated with the target data track If the target data track is a track in a shingled data band but is not the last data track (e.g., the non-overlapping track) in the data band, a selection operation 615 selects a first power level for a HAMR heat source and a selection operation 620 selects a first linear density. A write operation 625 then writes the data at the first linear density to the target data track while operating the heat source of a HAMR head at the first power level, creating a data track of a first width.

If, on the other hand, the determination operation 610 determines that the target data track is the last data track in a shingled data band, another selection operation 630 selects a second power level for the HAMR heat source and another selection operation 635 selects a second linear density. A write operation 640 then writes the data at the second linear density to the target data track while operating the heat source of the HAMR head at the second power level, creating a data track of a second width. In one implementation, the second power level is lower than the first power level, the second width is narrower than the first width, and the second linear density is higher than the first linear density. This reduction in track width of the last data track decreases wasted space on the storage medium and allows for a net increase in track density.

In some implementations, the last data track in a data band is further positioned to have a center offset from a center of a directly adjacent data track by an amount substantially equal to a center-to-center spacing of all data tracks in the data band. For example, the data band may have a substantially uniform track pitch, and last data track in the data band may have an effective track width equal to an effective track width of all other data tracks in the data band.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
   a storage medium;
   a heat-assisted magnetic recording (HAMR) head with a heat source; and
   a storage device controller configured to operate the HAMR head to write data to a data band of consecutive data tracks in a consecutive track order while dynamically altering a power level of the heat source to write the data to some data tracks of the data band, wherein the data band includes a first series of alternating data tracks and a second series of alternating data tracks interlaced with the first series, and each data track of the first series overlaps a previously-written track by a first offset and each data track of the second series overlaps a previously-written track by a second offset different than the first offset.

2. The system of claim 1, wherein the storage device controller is configured to alternate a power level of the heat source for data writes to alternating data tracks in the data band.

3. The system of claim 1, wherein the storage device controller is further configured to write data of a first linear density to the first series of alternating tracks in the data band and to write data of a second linear density to the second series of alternating data tracks in the data band.

4. The system of claim 1, wherein data tracks of the data band are arranged according to a uniform track pitch.

5. The system of claim 1, wherein the data band of consecutive data tracks is a shingled data band in a shingled magnetic recording system.

6. The system of claim 1, wherein all data tracks of the data band have a substantially uniform effective track width.

7. A method comprising:
   receiving an instruction to write data to a data band of consecutive data tracks on the storage medium according to a consecutive track order; and
   executing the instruction by writing the data to the data band according to the consecutive track order while dynamically altering a power level of the heat source to write data to some data tracks in the data band, wherein the data band includes a first series of alternating data tracks and a second series of alternating data tracks interlaced with the first series, and each data track of the first series overlaps a previously-written track by a first offset and each data track of the second series does not overlap any previously-written data track.

8. The method of claim 7, wherein executing the instruction further comprises:
   alternating a power level of the heat source for data writes to alternating data tracks in the data band.

9. The method of claim 7, further comprising:
   writing data of a first linear density to the first series of alternating tracks in the data band and writing data of a second linear density to the second series of alternating data tracks in the data band.

10. The method of claim 7, wherein data tracks of the data band are arranged according to a uniform track pitch.

11. The method of claim 7, wherein the data band of consecutive data tracks is a shingled data band in a shingled magnetic recording system.

12. The method of claim 7, wherein all data tracks of the data band have a substantially uniform effective track width.

* * * * *